United States Patent
Schmitt et al.

(10) Patent No.: US 11,311,890 B2
(45) Date of Patent: Apr. 26, 2022

(54) FILTER DEVICE

(71) Applicant: MANN+HUMMEL GmbH, Ludwigsburg (DE)

(72) Inventors: Juergen Schmitt, Hanhofen (DE); Klaus-Dieter Ruhland, Meckenheim (DE); Michael Kaufmann, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 262 days.

(21) Appl. No.: 16/593,810

(22) Filed: Oct. 4, 2019

(65) Prior Publication Data

US 2020/0030820 A1 Jan. 30, 2020

Related U.S. Application Data (63) Continuation of application No. PCT/EP2018/058831, filed on Apr. 6, 2018.
(Continued)

(30) Foreign Application Priority Data

Jun. 26, 2017 (DE) .................... 10 2017 005 958.6

(51) Int. Cl.
*B01D 46/00* (2022.01)
*B01D 45/16* (2006.01)
(Continued)

(52) U.S. Cl.
CPC ............... *B04C 3/04* (2013.01); *B01D 45/16* (2013.01); *B01D 46/0012* (2013.01);
(Continued)

(58) Field of Classification Search
CPC .. B01D 45/16; B01D 46/0012; B01D 50/002; B04C 3/04; B04C 3/06; B04C 9/00; F02M 35/0215; F02M 35/0202; F02M 35/0223
(Continued)

(56) References Cited

U.S. PATENT DOCUMENTS

| | | | |
|---|---|---|---|
| 2013/0327002 A1* | 12/2013 | Ackermann | ............... B04C 3/00 55/327 |
| 2014/0298761 A1* | 10/2014 | Ackermann | ........... B01D 45/16 55/457 |
| 2014/0299540 A1* | 10/2014 | Ackermann | ........... B01D 21/26 210/512.3 |

FOREIGN PATENT DOCUMENTS

| | | |
|---|---|---|
| DE | 10317694 A1 | 12/2004 |
| DE | 202006015231 U1 | 2/2008 |
| DE | 102010032169 A1 | 1/2012 |
| DE | 112010001706 T5 | 11/2012 |
| DE | 102011122322 A1 | 6/2013 |

(Continued)

*Primary Examiner* — Minh Chau T Pham (57) ABSTRACT

A filter device has a housing plate with a sleeve extending along a longitudinal axis perpendicular to the housing plate. The sleeve guides fluid containing particles along an inner sleeve surface to separate particles from the fluid and discharge the particles via a discharge window of the sleeve. An immersion tube plate opposite the housing plate has an immersion tube projecting coaxially into the sleeve for outflow of the fluid. The immersion tube has a sealing and centering section about an outer circumference of the immersion tube that forms a sealing surface parallel to the longitudinal axis and radially seals with an inner surface of the sleeve. The sealing and centering section extends about the immersion tube to provide coaxial alignment with the sleeve. A radial and/or axial expansion of the sealing and centering section is reduced in a predetermined region of the immersion tube opposite the discharge window.

16 Claims, 9 Drawing Sheets

Related U.S. Application Data

(60) Provisional application No. 62/482,536, filed on Apr. 6, 2017.

(51) Int. Cl.
*B01D 50/20* (2022.01)
*B04C 3/04* (2006.01)
*B04C 3/06* (2006.01)
*B04C 9/00* (2006.01)
*F02M 35/02* (2006.01)
*F02M 35/022* (2006.01)

(52) U.S. Cl.
CPC .............. *B01D 50/20* (2022.01); *B04C 3/06* (2013.01); *B04C 9/00* (2013.01); *B04C 2009/002* (2013.01); *F02M 35/0215* (2013.01)

(58) Field of Classification Search
USPC ...... 55/385.3, 442, 447, 345, 327, 337, 457; 95/271; 123/198 E; 210/512.3
See application file for complete search history.

(56) References Cited

FOREIGN PATENT DOCUMENTS

| | | | |
|---|---|---|---|
| DE | 102011122632 | A1 | 6/2013 |
| DE | 102015008525 | A1 | 2/2016 |
| DE | 102015001223 | A1 | 8/2016 |
| EP | 0344749 | B1 | 12/1989 |
| EP | 0558091 | B1 | 9/1993 |
| EP | 2555848 | A1 | 10/2011 |
| GB | 594576 | A | 11/1947 |
| WO | 2016082853 | A1 | 6/2016 |

\* cited by examiner

Fig. 9

FILTER DEVICE

CROSS-REFERENCE TO RELATED APPLICATIONS

This application is a continuation application of international application No. PCT/EP2018/058831 having an international filing date of 6 Apr. 2018 and designating the United States, the international application claiming a priority date of 6 Apr. 2017 based on prior filed U.S. provisional application Ser. No. 62/482,536 and a priority date of 26 Jun. 2017 based on prior filed German application for patent No. 10 2017 005 958.6, the entire contents of the aforesaid international application and the aforesaid German and United States patent applications being incorporated herein by reference.

BACKGROUND OF THE INVENTION

The present invention concerns a filter device that is suitable, for example, for filtering combustion air for an internal combustion engine.

Filter devices comprise frequently several filter stages in order to increase the separation efficiency for dirt particles from air or fluid. For example, a filter device can comprise a centrifugal separator for prefiltration of an incoming fluid. After such a prefiltration, a further purifying filtration by means of conventional filter media can be performed, for example.

Centrifugal separators comprise, for example, a housing plate with a plurality of sleeves for letting in an incoming fluid. The incoming fluid is then introduced in such a way into the sleeves that centrifugal forces accelerate the particles to be separated from the fluid so that they are separated from the fluid. The particles to be separated are removed via discharge windows from the sleeves while the purified fluid flows out through immersion tubes that extend into the respective sleeves. The immersion tubes in this context are part of an immersion tube plate with a plurality of projecting tube pieces. WO 2011/124675 A1 shows a corresponding cyclone separator as a centrifugal separator.

The respective sleeves are preferably sealed at the base of the immersion tubes. This has been found difficult due to the distortion and the thus required tolerances in case of large immersion tube plates and housing plates that are produced, for example, by injection molding processes.

SUMMARY OF THE INVENTION

It is therefore object of the present invention to provide an improved filter device.

Accordingly, a filter device is proposed. The filter device comprises a housing plate which comprises at least one sleeve that extends along a longitudinal axis extending perpendicularly relative to the housing plate, wherein the sleeve is configured to guide the fluid along an inner surface of the sleeve for separating particles from the fluid and wherein the sleeve comprises a discharge window for discharging separated particles. The filter device comprises moreover an immersion tube plate positioned opposite the housing plate, which comprises at least one immersion tube for outflow of the purified fluid, wherein the immersion tube extends along the longitudinal axis and projects coaxially into the sleeve. The immersion sleeve comprises a sealing and centering section circumferentially extending about an outer circumference of the immersion tube and is configured to form a sealing surface extending parallel to the longitudinal axis for radial sealing with an inner surface of the sleeve and which extends in such a way about the outer circumference of the immersion tube that the immersion tube is aligned coaxially relative to the sleeve. A radial and/or axial expansion of the sealing and centering section is reduced in a predetermined region in the region of the discharge window.

The filter device is suitable in particular for filtering a fluid, for example, air. The filter device can be used, for example, as an air filter for combustion air for internal combustion engines. In particular, the filter device is suitable for use in greatly dust-laden environments in which in particular agricultural or construction machines are used. The filter device can also be employed in a truck.

The housing plate and the immersion tube plate form together in particular a centrifugal separator which is also referred to as cyclone filter, cyclone, or cyclone separator. The centrifugal separator can be arranged, for example, as first separating stage in flow direction upstream of a conventional filter medium. The centrifugal separator can serve for separating solid or liquid particles contained in fluids.

The sleeve which is extending along the longitudinal axis can be embodied as an inlet of the fluid to be filtered. The longitudinal axis extends in particular along an inflow direction of the fluid to be filtered. The sleeve can be tubular. In particular, the sleeve has a round or oval cross section. The cross section area of the sleeve can change in the flow direction, in particular, decrease, in order to influence the speed at which the fluid flows through the sleeve and thus increase the preseparation efficiency. By an increased preseparation efficiency, the service life of a filter downstream in the flow direction can be increased.

The sleeve is in particular carried by the housing plate. For example, the sleeve can pass via a sleeve base into the housing plate. The sleeve can be formed monolithic with the housing plate. For example, the sleeve formed monolithic with the housing plate can be an injection-molded part. In this way, the housing plate can be manufactured particularly inexpensively.

The fluid flowing into the sleeve can be caused to rotate upon entering the sleeve such that it is guided along the inner wall of the sleeve. In this context, particles contained in the incoming fluid can be separated from the fluid. The particles can be discharged through the discharge window from the sleeve so that purified fluid remains in an outlet of the sleeve. The immersion tube for this purpose is longer along the longitudinal axis than a discharge window length.

The purified fluid can exit through the immersion tube from the sleeve. The immersion tube connects, for example, an interior of the sleeve with a filter medium that is arranged downstream of the centrifugal separator in flow direction. The immersion tube can have in particular a round or oval cross section. The cross section of the immersion tube can change along the longitudinal axis.

The immersion tube is carried in particular by the immersion tube plate. For example, the immersion tube can pass at an immersion tube base into the immersion tube plate. The immersion tube can be formed monolithic with the immersion tube plate. For example, the immersion tube plate formed monolithic with the immersion tube can be an injection-molded part. In this way, the immersion tube plate can be manufacture particularly inexpensively.

The housing plate and the immersion tube plate are in particular arranged parallel to each other so that the sleeve and the immersion tube are positioned opposite each other and so that the immersion tube projects into the sleeve.

The sealing and centering section enables in particular a radial sealing action of the sleeve with the immersion tube. In addition, the sealing and centering section can enable a centering action of the immersion tube within the sleeve in such a way that the immersion tube projects coaxially into the sleeve. The sealing and centering section can be, for example, a projection, a rim, an edge, a channel, a bevel, a groove, a rib, or a bead which extends on a circumferential surface of the immersion tube. The sealing and centering section can also be formed by a deformation, in particular by a local enlargement of the cross section of the immersion tube. In particular, the sealing and centering section comprises at least one surface that extends in the direction of the longitudinal axis and contacts the inner wall of the sleeve such that, at the contact location, the sealing surface for radial sealing of the immersion tube with the inner surface of the sleeve is formed (in the following also referred to as A sealing surface for radial sealing@). The term Aradial@ refers here to a direction which is substantially perpendicular to the longitudinal axis. The radius described later on extends in particular along a radial direction. The term Aaxial@, on the other hand, refers to a direction which extends substantially parallel to the longitudinal axis.

Upon insertion of the immersion tube into the sleeve, the sealing and centering section enables in particular that the immersion tube is aligned coaxially relative to the sleeve. This is in particular possible because the sealing and centering section, like the immersion tube plate and the housing plate, can be formed of relatively flexible plastic material. The coaxial alignment of the immersion tube within the sleeve increases moreover the preseparation efficiency. The centering function of the sealing and centering section is in particular advantageous for centering many parallel immersion tubes on one and the same immersion tube plate in many parallel sleeves of one and the same housing plate.

With the sealing and centering section, tolerances, in particular manufacturing tolerances of the immersion tube plate and of the housing plate, can be compensated, for example. Such tolerances can be produced, for example, when the housing plate and the immersion plate are produced by injection molding processes. In particular, the position of the sleeve and/or of the immersion tube at the housing plate or at the immersion tube plate can deviate from a nominal position so that the immersion tube cannot be aligned coaxially relative to the sleeve without the sealing and centering section. With the sealing and centering section, in particular undesirable gaps between the housing plate and the immersion tube plate can be compensated so that the preseparation efficiency is improved. The sealing and centering section extending radially along the immersion tube can in particular ensure that a sealing action between the immersion tube and the sleeve is realized. Due to the radial sealing action with the sealing surface for radial sealing, a preseparation efficiency of the centrifugal separator or of the filter device can thus be increased.

The sealing and centering section can also compensate a distortion of the components, in particular of the housing plate and of the immersion tube plate, that occurs, for example, in case of temperature fluctuations, and can further ensure a radial sealing action of the sleeve.

The region of the discharge window, also referred to as discharge window region, is in particular a region of the immersion tube which is located in the vicinity of the discharge window. In particular, the discharge window region is the region of the immersion tube in which the immersion tube is positioned opposite to a discharge area formed by the discharge window. The region of the discharge window extends in particular along a portion of the sealing and centering section. The region of the discharge window can comprise the predetermined region in which the radial and/or axial expansion or extension of the sealing and centering section is reduced. The radial expansion is in particular an expansion along a radius of the immersion tube or along the radial direction which extends perpendicularly relative to the longitudinal axis. A radius of the sealing and centering section can be reduced in the predetermined region relative to a radius of the sealing and centering section outside of the predetermined region. The axial expansion is in particular an expansion along the longitudinal axis or axial direction.

The axial and/or radial expansion of the sealing and centering section at the location or in the region of the discharge window is in particular reduced in comparison to an axial and/or radial expansion of the sealing and centering section in a region in which the discharge window is not present. In particular, the radial expansion or the radius of the sealing and centering section and/or the axial expansion of the sealing and centering section in the direction of the longitudinal axis along the outer circumference of the immersion tube is constant, with the exception of the region of the discharge window. For example, the radial and/or axial expansion of the sealing and centering section can be reduced by a deformation or a cutout in the sealing and centering section in the region of the discharge window.

The discharge area for discharging the particles is defined in particular by the discharge window and the sealing and centering section. The discharge area extends, for example, parallel to the longitudinal axis. Since the radial and/or axial expansion of the sealing and centering section is reduced in the region of the discharge window, in particular the discharge area or an opening that is formed by the discharge window for discharging the particles is enlarged. In this way, more particles can be discharged from the discharge window and a preseparation efficiency of the filter device can be increased.

According to an embodiment, the sealing and centering section in the predetermined region, which is defined by a projection of a contour of the discharge window in the direction toward the longitudinal axis onto the immersion tube, is recessed such that the discharge area through which the separated particles can be discharged via the discharge window is enlarged.

The predetermined region can be the region of the immersion tube which is not covered by the sleeve but is exposed by the discharge window. The predetermined region is in particular determined by the shape of the discharge window. In the predetermined region, the sealing and centering section can be recessed in the direction toward the immersion tube plate and/or recessed in the direction toward the longitudinal axis. Due to the enlarged discharge area, the preseparation efficiency of the filter device can be increased.

According to a further embodiment, the sealing and centering section in the predetermined region is recessed along the longitudinal axis in the direction toward the immersion tube plate. In particular, a spacing between the immersion tube plate and the sealing and centering section in the predetermined region is smaller than outside of the predetermined region.

According to a further embodiment, the sealing and centering section is provided at a base of the immersion tube, in the following also immersion tube base, which passes into the immersion tube plate. In this way, the immersion tube plate with the immersion tube and the sealing and centering section can be manufactured by an inexpensive injection molding process.

According to a further embodiment, the sealing and centering section comprises at least one radial step which extends along the sealing and centering section. In particular, the step extends along the outer circumference of the immersion tube. The step can also be referred to as shoulder. The step comprises in particular a first surface which extends in an annular shape and perpendicular to the longitudinal axis as well as a second surface which extends annularly about the longitudinal axis. The first surface of the step which extends perpendicular to the longitudinal axis contacts the sleeve in particular such that at the contact location the sealing surface for radial sealing is formed.

According to a further embodiment, an edge of the sleeve is resting against the base of the immersion tube, against the step of the circumferentially extending sealing and centering section and/or against the immersion tube plate for axial sealing in such a way that a sealing surface that extends radially perpendicularly to the longitudinal axis is formed with the immersion tube.

According to a further embodiment, the sealing and centering section in the predetermined region, viewed along the longitudinal axis, is recessed to the axial position of the contact surface, in particular of the immersion tube base. This means that preferably the recess in axial direction is delimited by the contact surface at which the sleeve is axially resting, in particular by the immersion tube base surface. The contact surface extends in this context preferably perpendicular to the longitudinal axis in the region in which the radial expansion of the immersion tube or of the sealing and centering section is reduced.

The edge of the sleeve or the sleeve edge extends in particular perpendicular to the longitudinal axis. The edge is in particular part of an open end of the sleeve and is in particular opposite the sleeve base which passes into the housing plate. This sleeve edge can contact the immersion tube base, the step and/or the immersion tube plate in order to provide an axial sealing action between the immersion tube and the sleeve. The contact surface is in particular in this context a sealing surface that extends perpendicularly to the longitudinal axis. The sealing surface extending perpendicularly to the longitudinal axis is referred to in particular also as sealing surface for axial sealing.

For example, the open end of the sleeve is resting on the step surface which is extending parallel to the longitudinal axis and forms, at the contact location, the sealing surface for axial sealing.

Since in addition to the radial sealing action also an axial sealing action can be provided, it is possible to further increase the preseparation efficiency of the filter device.

According to a further embodiment, the discharge window is embodied as an opening or cutout at the edge of the sleeve. The discharge window is in particular a cutout of a sleeve wall. In particular, the discharge window is provided at the downstream side at the sleeve. The discharge window is embodied at the sleeve, for example, at the bottom in the direction of the force of gravity. The particles which are discharged from the sleeve through the discharge window can be discharged from the filter device in particular through a valve which is downwardly oriented in the direction of the force of gravity.

According to a further embodiment, the discharge window is rectangular. The discharge window can also be of a parallelepipedal shape, of a diamond shape, or a trapezoidal shape.

According to a further embodiment, the sleeve comprises an inlet with a guide element for inflow of the fluid which is configured to cause a rotation of the fluid along the inner surface of the sleeve for separation of the particles through the discharge window. The guide element is in particular embodied as a plurality of guide vanes that are provided at the inlet or at an entry of the sleeves and generate an eddy or swirl flow of the incoming fluid within the sleeve. In particular, the guide element generates a spiral-shaped flow of the fluid along the inner surface of the sleeve. Based on the guide element, the inflowing fluid can be efficiently guided in the direction toward the inner wall of the sleeve so that a preseparation efficiency of the filter device can be increased.

According to a further embodiment, the housing plate comprises a plurality of sleeves which extend each along the longitudinal axis and the immersion tube plate comprises a plurality of immersion tubes which extend each along the longitudinal axis so that the respective immersion tubes project coaxially into the respective sleeves. The plurality of sleeves and plurality of immersion tubes can be configured like the sleeves and immersion tubes described above or below. In particular, each of the sleeves comprises a discharge window and each of the immersion tubes comprises a sealing and centering section which is extending radially along the outer circumference of the immersion tube. The plurality of immersion tubes can extend parallel to each other, in particular along the longitudinal axis. Moreover, the plurality of sleeves can extend parallel to each other, in particular along the longitudinal axis. The plurality of sleeves and immersion tubes form together in particular a so-called multi-cyclone block.

The radial sealing action of the respective sleeves with the immersion tubes is in particular beneficial in housing plates and immersion tube plates with a plurality of sleeves and immersion tubes because the housing plates and immersion tube plates are large components which, in particular due to their weight, often exhibit a significant distortion. The sealing and centering sections ensure in particular that even for large components the respective immersion tubes project coaxially into the respective sleeves. In this way, a clearance-free coupling of the sleeves with the immersion tubes can be achieved. Moreover, the radial and/or axial expansion of the sealing and centering section in the discharge window region can be reduced such that the discharge areas formed by the respective discharge openings are enlarged. In this way, the preseparation efficiency of the entire filter device with a plurality of sleeves and immersion tubes can be increased.

According to a further embodiment, the filter device comprises a filter element that is configured to filter the fluid that is flowing out of the immersion tube. The filter element in flow direction is arranged in particular downstream of the centrifugal separator or downstream of the immersion tube. The fluid that reaches the filter element is in particular prefiltered and is free of coarse particles because the latter have been discharged through the discharge window. As filter elements, in particular air filters with a filter medium for filtering air are suitable.

According to a further embodiment, the immersion tube tapers conically in the direction of the housing plate. In particular, the cross section of the immersion tube tapers in the direction toward the housing plate. In other words, the cross section area of the immersion tube is enlarged in the flow direction. Since a cross section area of the immersion tube in the direction of the housing plate is small, no particles can reach the immersion tube and a preseparation efficiency can be improved.

Further possible implementations of the filter device comprise also combinations, not explicitly mentioned, of features or embodiments of the filter device described above or in the following in regard to the embodiments. A person of skill in the art will also add or modify individual aspects as improvements or supplements to the respective basic configuration of the filter device.

Further embodiments of the filter device are subject matter of the dependent claims as well as of the embodiments described in the following of the filter device. In the following, the filter device will be explained in more detail with the aid of the embodiments with reference to the attached figures.

BRIEF DESCRIPTION OF THE DRAWINGS

In the Figures, same reference characters identify same or functionally the same elements if nothing to the contrary is indicated.

DESCRIPTION OF PREFERRED EMBODIMENTS

Figure 1:
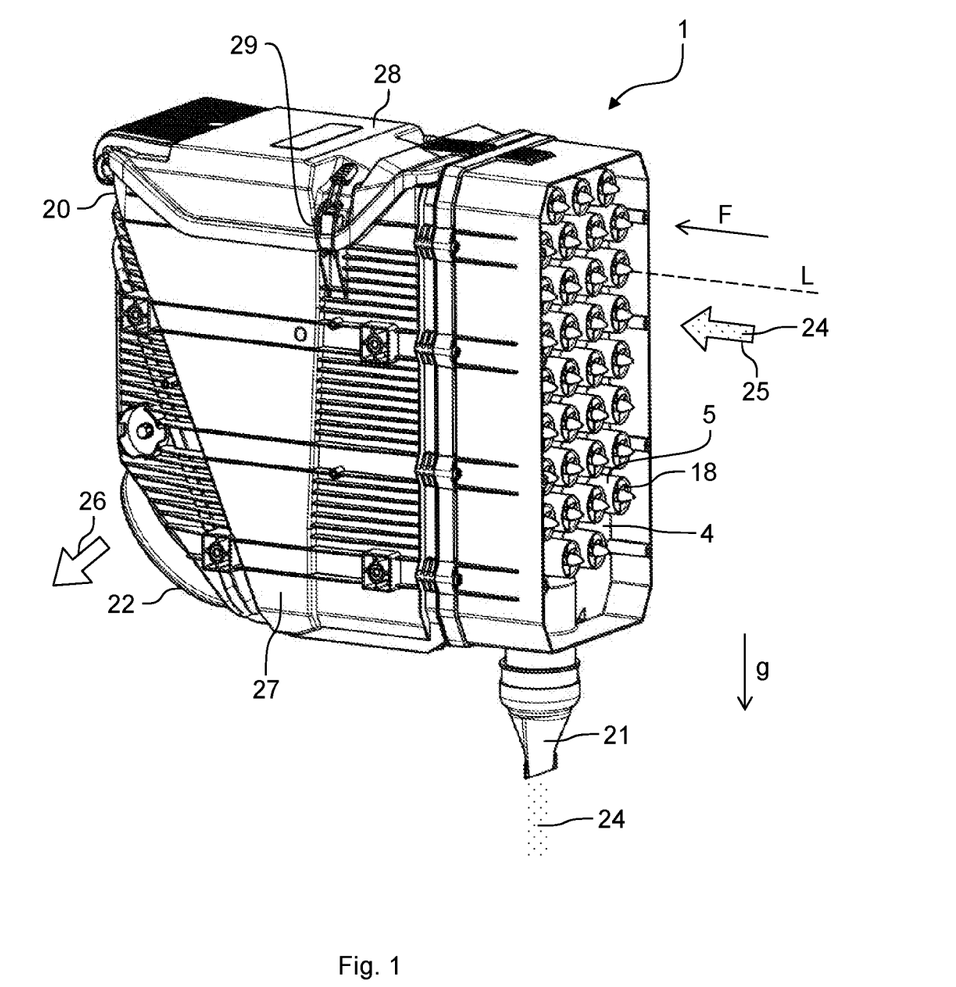
FIG. 1 shows a view of a filter device according to a first embodiment.
Figure 2:
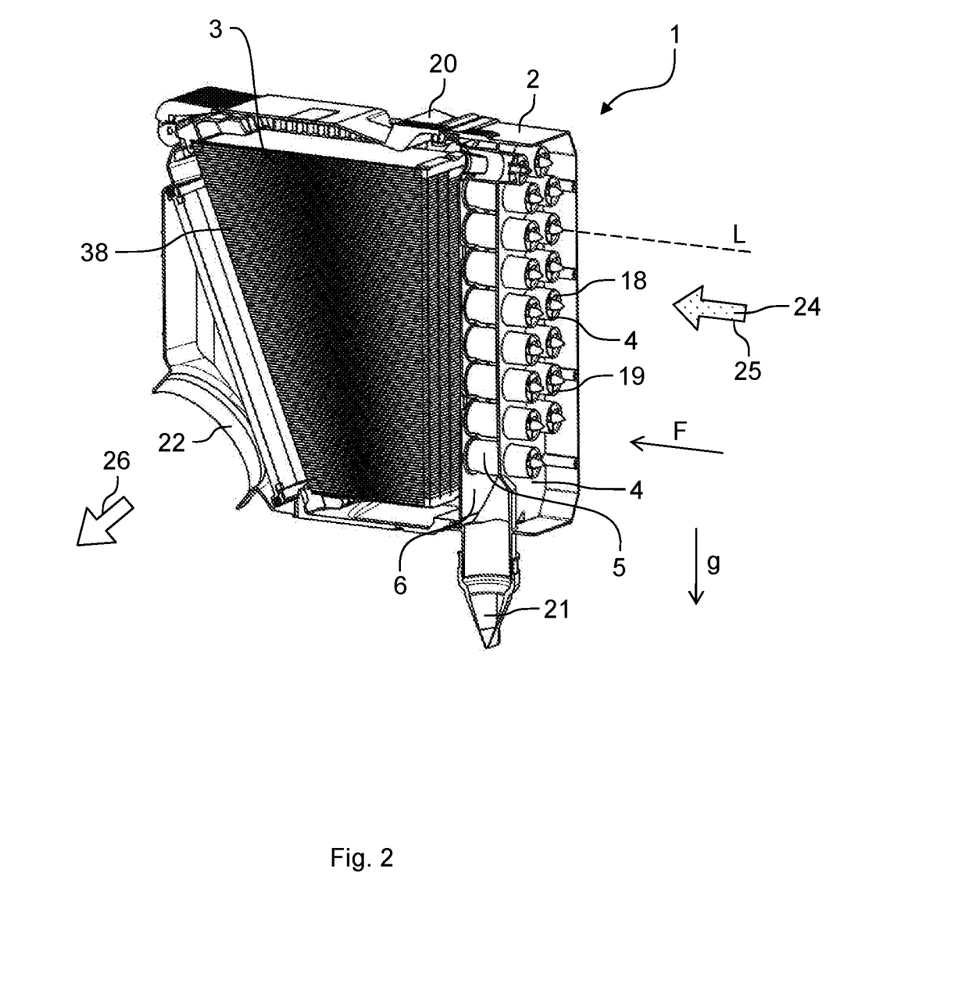
FIG. 2 shows a section view of the filter device according to the first embodiment.

FIG. 1 shows a view of an embodiment of a filter device 1 and FIG. 2 shows a section view of the same filter device 1. In the following, reference is being had simultaneously to FIGS. 1 and 2. The filter device comprises a housing 20 which is comprised of a pot 27 and a removable cover 28. The cover 28 can be attached by a clasp mechanism 29 to the pot 27. Within the housing 20, a centrifugal separator 2 is provided which is arranged upstream of the filter element 3 in a flow direction F of the fluid.

The filter device 1 is suitable in particular for motor vehicles, for example, trucks as well as rail vehicles, aircraft, watercraft, for building technology, track and crawler vehicles or the like.

The centrifugal separator 2 comprises a housing plate 4 that forms an inflow-side wall of the housing 20 as well as an immersion tube plate 6. By means of the centrifugal separator 2, a fluid laden with particles 24 is purified of the particles 24. The fluid is a gas such as air, for example. The particles 24 can be solids, for example, dust, sand, or liquid droplets. In FIGS. 1 and 2, a raw fluid 25 flowing into the filter device 1 and laden with the particles 24 is indicated by arrows. After passing through the centrifugal separator 2, the air flows through the filter element 3 where the air is filtered by means of a filter medium 38. Subsequently, the purified air or clean fluid 26 flows out of the filter device 1 via a fluid outlet 22.

The particles 24 are separated in the centrifugal separator 2 from the raw fluid 25 and, in the direction of the force of gravity g, are guided downward out of the filter device 1 through a discharge pipe 21 which can comprise a valve.

The housing plate 4 comprises a plurality of tubular sleeves 5 which extend parallel to each other along a longitudinal axis L perpendicular to the housing plate 4. The longitudinal axis L is here parallel to the flow direction F. For clarity, in FIGS. 1 and 2, only a single sleeve 5 is provided with a reference character. The respective sleeves 5 comprise a fluid inlet 18 for inflow of the raw fluid 25. In each fluid inlet 18, a guide element 19 is arranged that in particular assumes the shape of guide vanes. The guide element 19 is configured to accelerate the raw fluid 25 laden with the particles 24 such that the particles 24 are separated from the raw fluid 25 and the particles 24 can be discharged, separate from the clean fluid 26, out of the filter element 1. For this purpose, the guide vanes 19 cause the raw fluid 25 laden with the particles 24 to undergo a spiral rotation along the inner surface of the respective sleeve 5.

Figure 3:
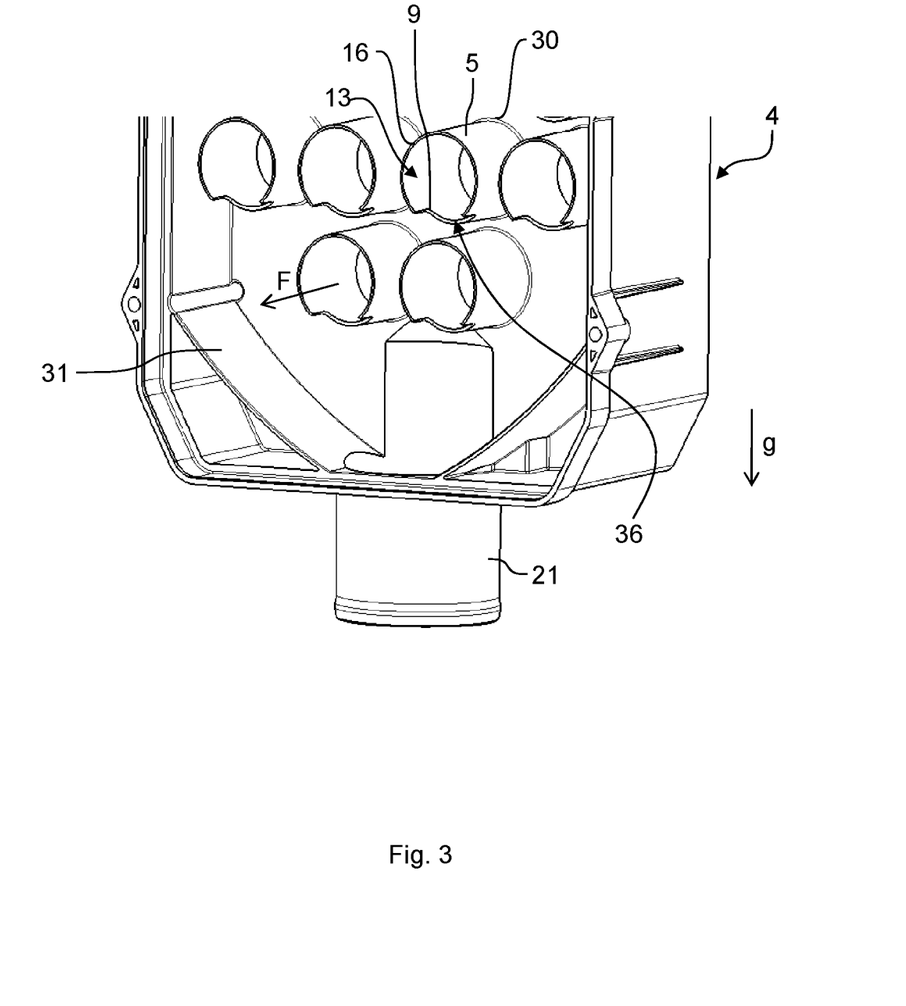
FIG. 3 is a view of a housing plate according to the first embodiment.

The housing plate 4 will be described in more detail with the aid of FIG. 3. FIG. 3 shows a detail of the housing plate 4 according to one embodiment. In FIG. 3, six identically embodied sleeves 5 with a round cross section are illustrated of which only one is provided with reference character. The guide elements 19 are not illustrated in FIG. 3. The flow direction through the sleeve 5 is marked by arrow F.

Each sleeve 5 passes at a base 30 into the housing plate 4. The housing plate 4 is in particular an injection-molded part that is formed monolithic with the sleeves 5. A discharge window 9 for discharging separated particles 24 is provided at an edge 16 of the sleeve 5 which is arranged distal to the sleeve base 30. The discharge window 9 is embodied as a rectangular opening oriented downwardly in the direction of the force of gravity g or as a cutout with a contour 36 at the edge 16 of the sleeve 5.

Optionally, the housing plate 4 comprises in addition a funnel 31 which guides the particles 24 discharged through the discharge window 9 into the discharge pipe 21.

In a mounted state of the filter device 1, parallel to the housing plate 4 and in flow direction F downstream of the housing plate 4, the immersion tube plate 6 illustrated in FIG. 2 is arranged. The latter will be explained in more detail with the aid of FIG. 4.

Figure 4:
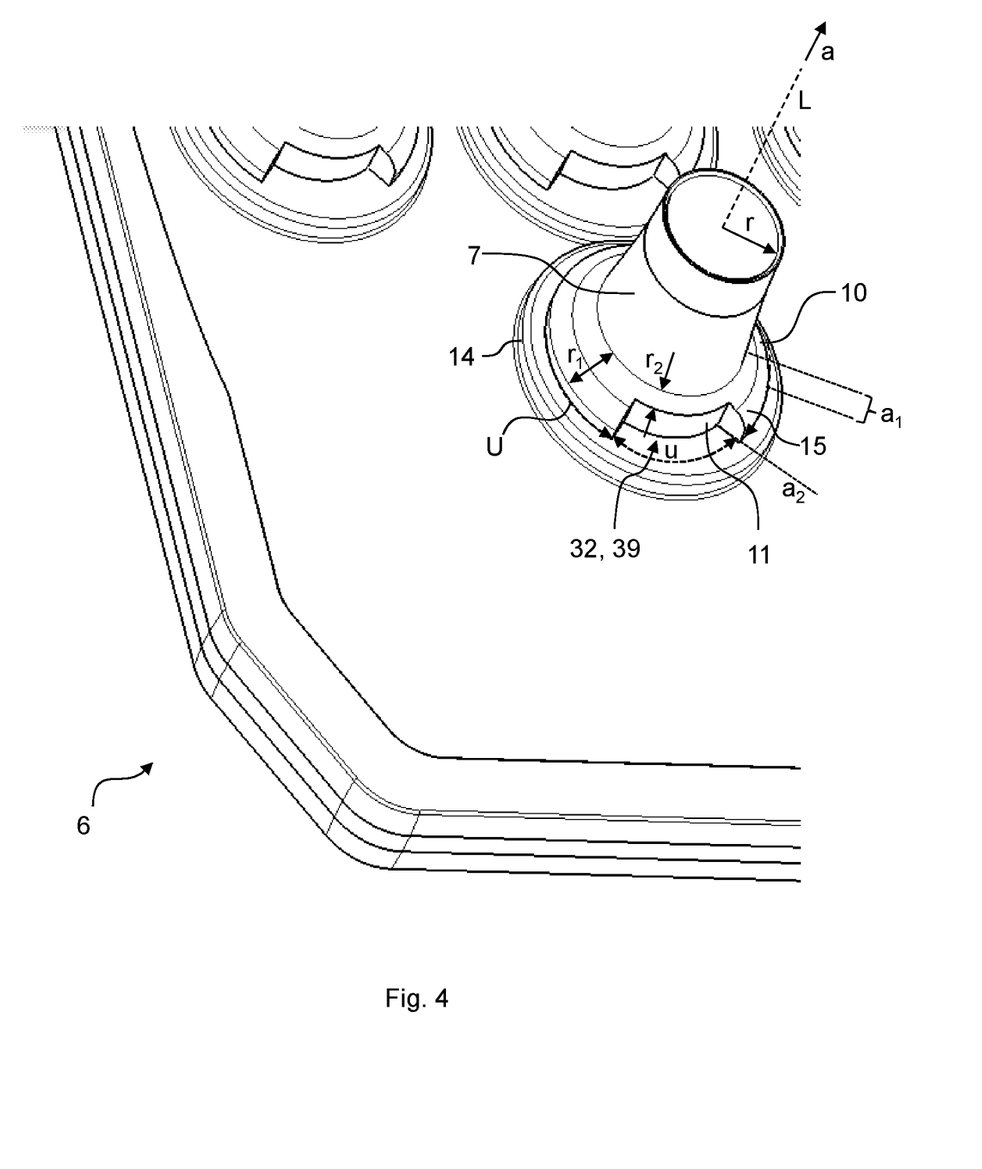
FIG. 4 is a view of an immersion tube plate according to the first embodiment.

FIG. 4 shows a detail of the immersion tube plate 6 according to an embodiment. The immersion tube plate 6 comprises a plurality of identical immersion tubes 7 with round cross sections of which in FIG. 4 only a single one is illustrated completely. In particular, the immersion tube plate 6 comprises as many immersion tubes 7 as the housing plate 4 comprises sleeves 5.

The immersion tube 7 is arranged perpendicular to the immersion tube plate 6 along the longitudinal axis L. The immersion tube 7 passes at a step-like immersion tube base 14 of the immersion tube 7 into the immersion tube plate 6.

The immersion tube plate 6 is in particular an injection-molded part that is monolithically formed with the immersion tubes 7.

The immersion tube base 14 passes into a sealing and centering section 10 which is provided along the outer circumference of the immersion tube 7. The sealing and centering section 10 comprises in particular a step 15 that extends along the circumferential sealing and centering section 10 at the circumference of the immersion tube 7. The sealing and centering section 10, with the exception of a predetermined region 39 which corresponds to a region of the discharge window or a discharge window region 32, has along the circumference U of the immersion tube 7 a constant radial expansion $r_1$ along a radial direction r as well as a constant axial extension $a_1$ along an axial direction a. The axial direction a extends along the longitudinal axis L and the radial direction r extends perpendicularly to the axial direction a or perpendicularly to the longitudinal axis L.

In the predetermined region 39 which extends along a region u of the outer circumference U of the sealing and centering section 10, the radius $r_1$ as well as the axial expansion $a_1$ are reduced. The sealing and centering section 10 is recessed in the predetermined region 39 in the direction toward the immersion tube center in such a way that a radial expansion $r_2$ in the predetermined region 39 is smaller than the radial expansion $r_1$ outside of the predetermined region 39. Moreover, the sealing and centering section 10 in the predetermined region 39 is recessed in the direction toward the immersion tube plate 6 such that an axial expansion $a_2$ in the predetermined region 39 is zero and thus also smaller than the axial expansion $a_1$ outside of the predetermined region 39. Due to the reduction of the radial expansion $r_1$ and of the axial expansion $a_1$ of the sealing and centering section 10, a cutout 11 in the sealing and centering section 10 is formed in the predetermined region 39 or discharge window region 32. The cutout 11 extends across the region u of the outer circumference U of the sealing and centering section 10.

The sealing and centering section 10 of FIG. 4 will be explained in more detail with the aid of FIGS. 5 and 6.

Figure 5:
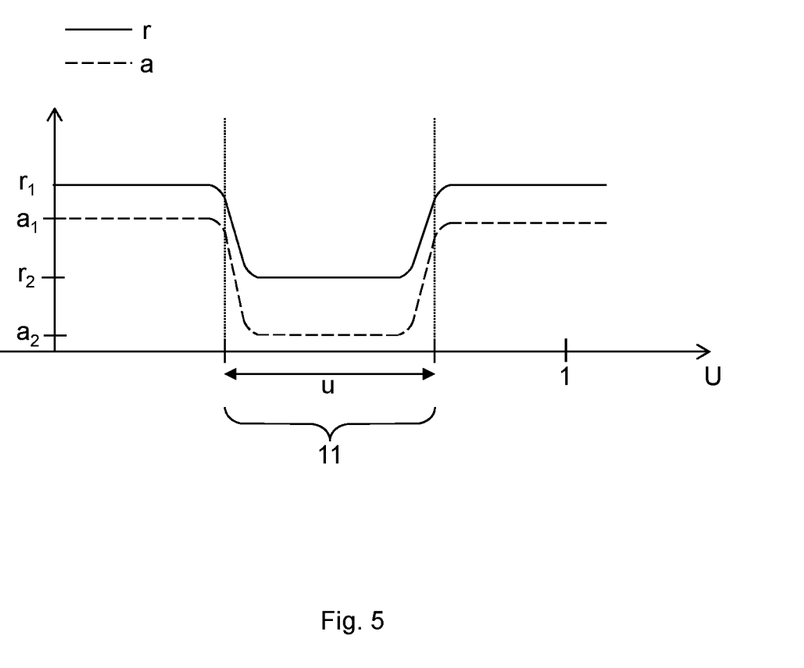
FIG. 5 is a view of a developed sealing and centering section according to the first embodiment.

FIG. 5 shows a view of the developed sealing and centering section 10 of the immersion tube 7 of FIG. 4. FIG. 5 shows a variation of the radial and axial expansions $r_1$ and $a_1$ of the sealing and centering section 10 along the outer circumference U of the immersion tube 7. The radial expansion of the immersion tube 7, with the exception of the region u of the outer circumference U, is substantially constant at the value $r_1$. In the region u, the radial expansion $r_1$ of the immersion tube is reduced to $r_2$, so that the cutout 11 is generated.

The axial expansion of the immersion tube 7, with the exception of the region u of the outer circumference U, is substantially constant at the value $a_1$. In the region u, i.e., in the region of the cutout 11, the axial expansion $a_1$ of the immersion tube is reduced to $a_2$, wherein $a_2$ is zero.

Figure 6:
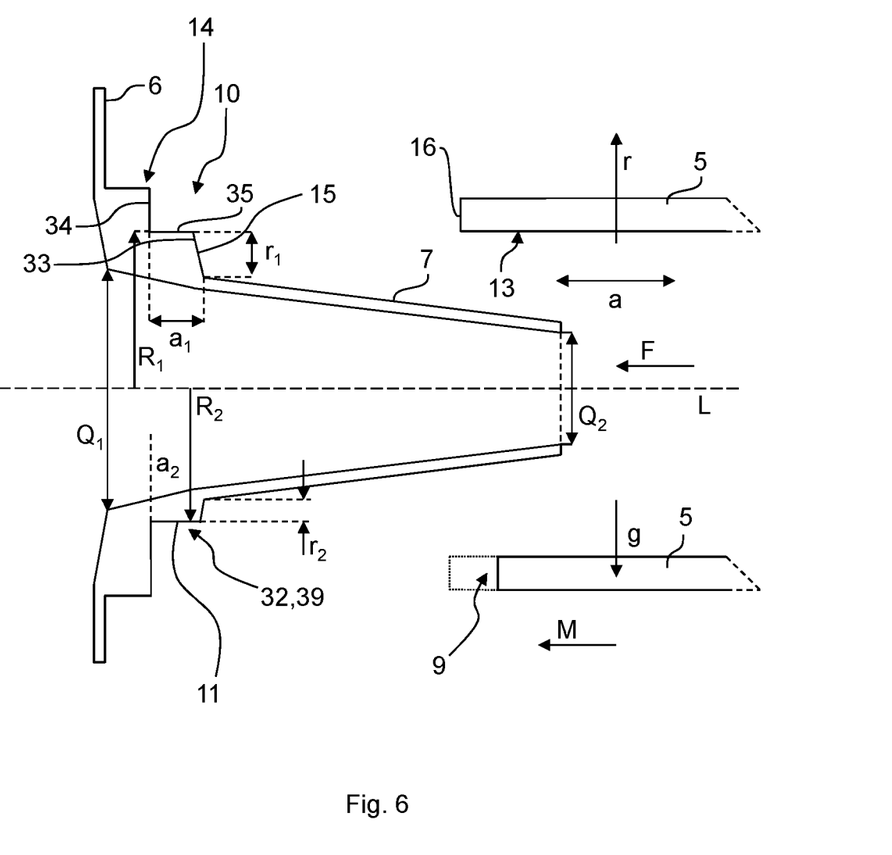
FIG. 6 is a section view of an immersion tube plate according to the first embodiment.

FIG. 6 shows a section view of the immersion tube plate 6 of FIG. 4 along a surface which extends parallel to the longitudinal axis L and in the direction of the force of gravity g. The step 15 comprises a surface 35 which extends parallel to the longitudinal axis L and a surface 33 which is substantially perpendicular to the longitudinal axis. The step 15 adjoins an immersion tube base surface 34 of the immersion tube base 16 which extends perpendicular to the longitudinal axis L.

A diameter Q1 of the immersion tube 7 at the immersion tube plate is greater than a diameter Q2 of the immersion tube 7 facing the housing plate so that also a cross section of the immersion tube 7 at the immersion tube plate is greater than a cross section at the housing plate. FIG. 6 shows thus an immersion tube 7 which tapers conically opposite to the flow direction F.

The sealing and centering section 10, with the exception of the discharge window region 32 which corresponds to the predetermined region 39, has an already described constant radius $r_1$ along the radial direction r which extends perpendicularly to the longitudinal axis L and an already described constant axial expansion $a_1$ along the axial direction a which extends parallel to the longitudinal axis L. In the discharge window region 32 which is pointing downward in the direction of the force of gravity g, as already described above, the radial and the axial expansions $r_1$, $a_1$ of the sealing and centering section 10 are reduced so that the cutout 11 is formed in the sealing and centering section 10.

In the predetermined region 39, the radial expansion $r_1$ is reduced such that a radius $R_2$ of the sealing and centering section 10 in the predetermined region 39 is smaller than a radius $R_1$ of the sealing and centering section 10 outside of the predetermined region 39.

In the discharge window region 32, the step 15 is recessed toward the immersion tube center axis that is illustrated by the longitudinal axis L and toward the immersion tube plate 6. The step surface 35 in this context is recessed in the discharge window region 32 by a spacing $r_1$-$r_2$ toward the immersion tube center axis. The step surface 33 is moreover recessed in the discharge window region 32 by the axial expansion $a_1$ along the longitudinal axis L toward the immersion tube plate 6.

In FIG. 6, a sleeve 5 is illustrated which can be placed coaxially onto the immersion tube 7 along a mounting direction M which extends parallel to the longitudinal axis. In this context, the discharge window 9 of the sleeve 5, illustrated in dotted line, points downward along the direction of the force of gravity g so that the discharge window 9 and the cutout 11 are positioned opposite each other in the mounted state of the filter device 1.

Figure 7:
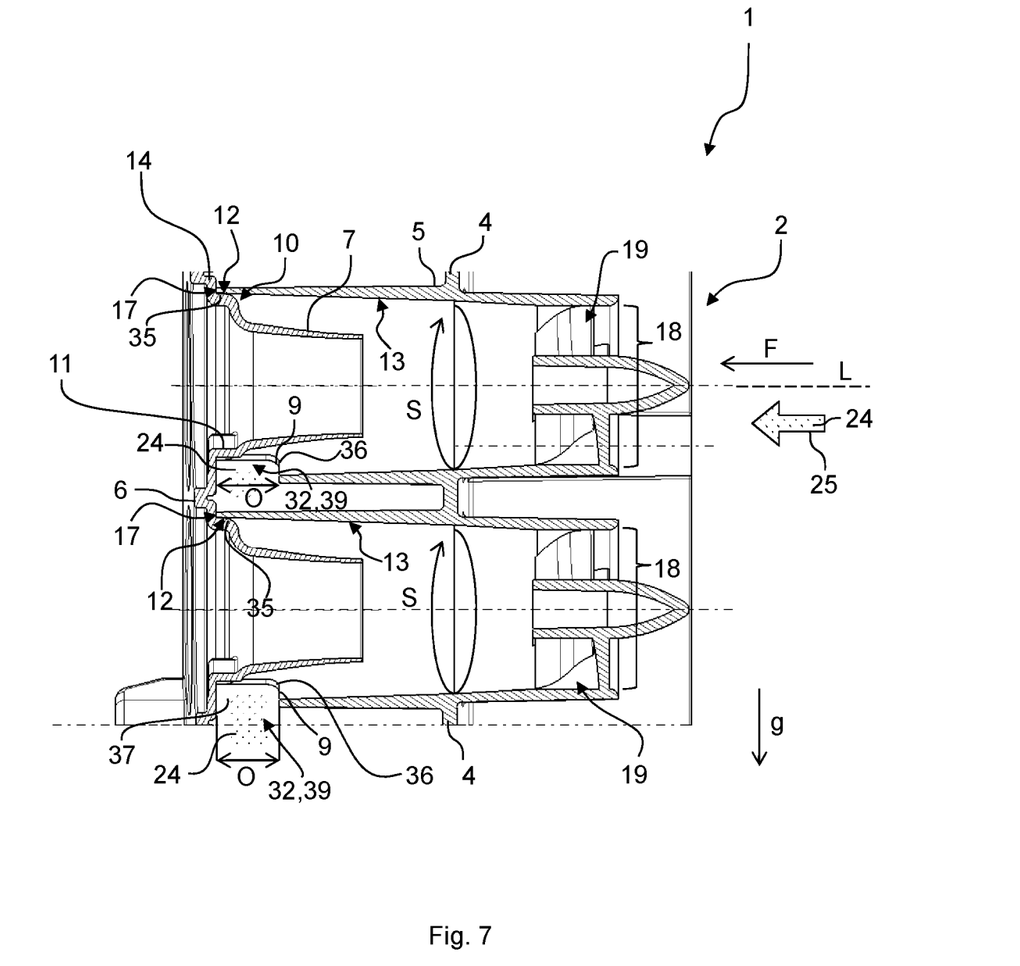
FIG. 7 is a section view of a part of the filter device according to the first embodiment.
Figure 8:
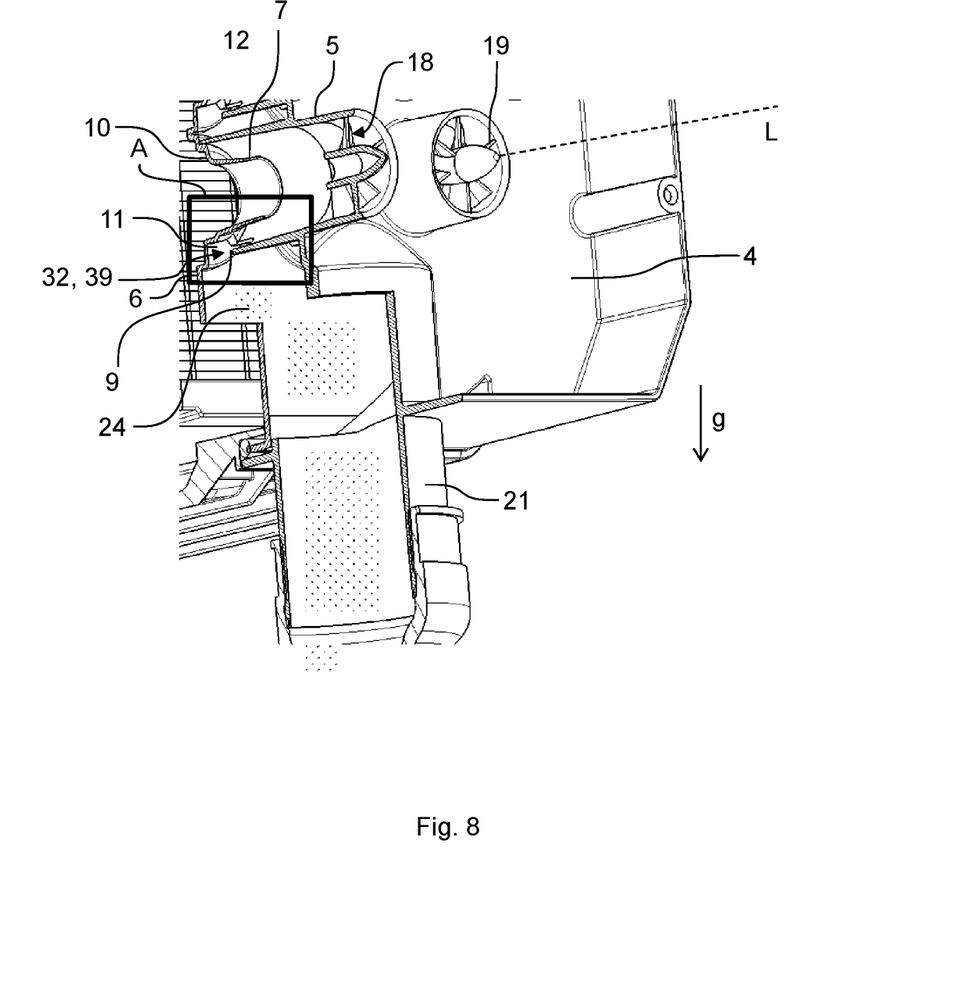
FIG. 8 shows a detail view of the part of the filter device according to the first embodiment.
Figure 9:
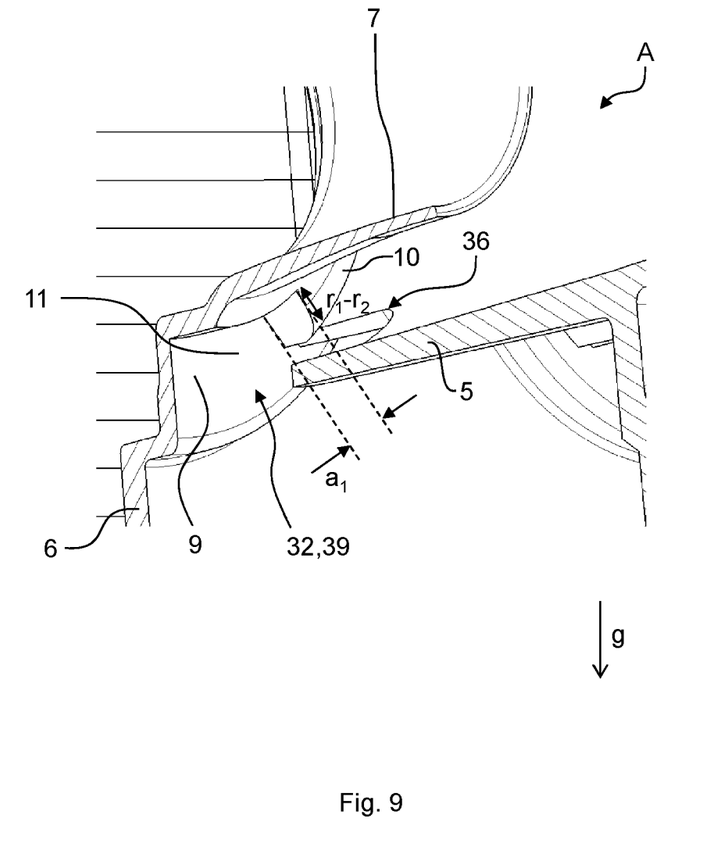
FIG. 9 shows an enlarged view of a part of the filter device according to the first embodiment.

In the mounted state, moreover the respective immersion tubes 7 of the immersion tube plate 6 project into the respective sleeves 5 of the housing plate 4. In the mounted state, it is moreover defined in this way that the edge 16 is contacting the immersion tube base surface 34 and that an inner wall or inner surface 13 of the sleeve 5 is contacting the surface 35 of the step 15. This mounted state is illustrated in FIGS. 7 through 9. FIG. 9 shows a detail of the region A framed in FIG. 8. In the following, reference is being had to FIGS. 7 to 9 together.

The sealing and centering section 10 serves for alignment of the immersion tube 7 within the sleeve 5 and for sealing the immersion tube 7 with the sleeve 5. At the contact location between the inner wall 13 and the surface 35, a sealing surface 12 for radial sealing of the immersion tube 7 with the inner surface 13 of the sleeve 5 is thus formed which extends about the circumference of the immersion tube 7 parallel to the longitudinal axis L. The sealing surface 12 avoids escape of fluid through gaps between the immersion tube 7 and the sleeve 5 so that a preseparation efficiency of the centrifugal separator 2 is increased. In this way, a distortion of the housing plate 4 and immersion tube plate 6 produced by injection molding processes can be compensated. Moreover, the sealing and centering section 10 enables a coaxial alignment of the immersion tube 7 within the sleeve 5.

In the mounted state, the sleeve edge 16 illustrated in FIG. 6 is positioned also with a surface oriented perpendicular to the longitudinal axis L at the immersion tube base surface 34 of the immersion tube base 14 illustrated in FIG. 6. At a contact location between the immersion tube base surface 34 and the edge 16, a sealing surface 17 for radial sealing is formed which extends perpendicular to the longitudinal axis L. This sealing surface 17 causes a further increase of the preseparation efficiency of the centrifugal separator 2.

In the mounted state, the predetermined region 39 of the discharge window region 32 and the discharge window 9 are positioned opposite each other so that the predetermined region 39 of the immersion tube 7 corresponds to a projection of the contour 36 of the discharge window 9 in the direction toward the longitudinal axis L onto the immersion tube 7. An opening area or discharge area O of an opening 37, which is formed by the discharge window 9, on the one hand, and by the sealing and centering section 10, on the other hand, and which serves for discharging the particles 24 from the sleeve 5, is enlarged by the cutout 11 in the sealing and centering section 10, described in relation to FIGS. 4 to 6. The cutout 11 as well as the axial and radial reduction of the sealing and centering section 10 in the predetermined region 39 can be seen particularly well in FIG. 9. Due to the enlarged discharge area O, more particles 24 can be discharged from the discharge window 9. In this way, the preseparation efficiency of the centrifugal separator 2 is increased.

In particular, it is not a problem in regard to the sealing action of the immersion tube plate 6 relative to the housing plate 4 to reduce the extension of the sealing and centering section 10 along the longitudinal axis L in the region of the discharge window 9 because here the sealing and centering section 10 does not contact the sleeve 5 anyway and therefore has no sealing function.

FIGS. 7 and 8 show furthermore the guiding elements 19 that are arranged in the fluid inlet 18 of the sleeve 15. The guiding elements 19, here guide vanes, accelerate the raw fluid 25 and cause a spiral rotation S of the raw fluid so that the raw fluid 25 is guided along the inner wall 13 within the sleeve 5. The particles 24 are thus separated from the raw fluid 25 and discharged via the discharge window 9 from the sleeve. The purified fluid, on the other hand, flows along the flow direction F into the immersion tube 7.

Even though the present invention has been explained with the aid of embodiments, it can be modified in various ways. The sealing and centering section 10 can also be completely removed within the discharge window region 32. The shape of the discharge window 9 can be changed at will. Also, the discharge window region 32 can have an arbitrary shape and can also be larger or smaller than the projection of the contour 36 of the discharge window 9 onto the immersion tube 7. The sealing and centering section 10 can also be provided with a deformation in place of the cutout 11 in the predetermined region 39. For example, the sealing and centering section 10 can comprise a plurality of steps 15 or can be embodied as a raised rim of the immersion tube 7. Moreover, the edge 16 can also directly contact the immersion tube plate 6. Furthermore, the predetermined region 39 and the discharge window region 32 must not be identical. The filter device 1 and the housing 4 can assume an arbitrary shape and can be arranged at will, for example, also in a horizontal arrangement. It is also conceivable that not all of the plurality of immersion tubes 7 and sleeves 5 at the immersion tube plate 6 and at the housing plate 4 are identically embodied. In particular, the immersion tubes 7 and the sleeves 5 can have different cross section areas. Also, a housing plate 4 with a single sleeve 5 as well as an immersion tube plate 6 with a single immersion tube 7 are conceivable.

LIST OF REFERENCE CHARACTERS 1 filter device
2 centrifugal separator
3 filter element
4 housing plate
5 sleeve
6 immersion tube plate
7 immersion tube
9 discharge window
10 sealing and centering section
11 cutout
12 sealing surface for radial sealing
13 sleeve inner surface
14 immersion tube base
15 step
16 edge of the sleeve
17 sealing surface for axial sealing
18 fluid inlet
19 guide element
20 housing
21 discharge pipe
22 fluid outlet
24 particles
25 raw fluid
26 purified fluid
27 pot
28 cover
29 clasp mechanism
30 sleeve base
31 funnel
32 discharge window region
33, 35 step surface
34 immersion tube base surface
36 contour
37 opening
38 filter medium
39 predetermined region
a axial direction
$a_1$, $a_2$ axial expansion
A region
L longitudinal axis
F flow direction
g direction of force of gravity
M mounting direction
O discharge area
Q1, Q2 immersion tube diameter
r radial direction
$r_1$, $r_2$ radial expansion
$R_1$, $R_2$ radius
S rotation
u region of outer circumference of the immersion tube
U outer circumference

What is claimed is:

1. A filter device comprising:
    a housing plate comprising:
        at least one sleeve connected to the housing plate and projecting axially outwardly from the housing plate along a longitudinal axis (L),
        wherein the longitudinal axis (L) extends perpendicularly to the housing plate,
        wherein the at least one sleeve comprises
            a discharge window and is configured to guide a fluid containing particles along an inner surface of the at least one sleeve to separate the particles from the fluid and to discharge the particles via the discharge window;
    an immersion tube plate positioned axially opposite to and spaced away from the housing plate, the immersion tube plate comprising:
        at least one immersion tube arranged on the immersion tube plate and projecting axially outwardly towards the housing plate along the longitudinal axis (L),
        wherein the at least one immersion tube enables outflow of the fluid separated from the particles;

wherein the at least one immersion tube comprises:
a sealing and centering section arranged in a region of the at least one immersion tube adjacent to the immersion tube plate and extending along on an outer circumference of the at least one immersion tube, the sealing and centering section projecting radially outward from the at least one immersion tube and circumferentially surrounding the at least one immersion tube,
wherein the sealing and centering section is sized and configured to be received into the interior of the at least one sleeve;
wherein at least a portion of the radially outer surface of the sealing and centering section forms a first sealing surface;
wherein the first sealing surface radially seals against a radially inner surface of the at least one sleeve, such that the at least one immersion tube is coaxially aligned relative to the at least one sleeve;
wherein the sealing and centering section, in a region where the discharge window is not present, projects radially outwardly from the outer circumference of the at least one immersion tube by a first radial expansion r1;
wherein the sealing and centering section, in a region where the discharge window is present, projects radially outwardly from the outer circumference of the at least one immersion tube by a second radial expansion r2;
wherein r2<r1, such that an enlarged gap is formed between the sealing and centering section and the inner surface of the at least one sleeve in the region neighboring and facing to the discharge window, thereby providing an enlarged flow space for the particles to flow past the sealing and centering section to exit the at least one sleeve through the discharge window.

2. The filter device according to claim 1, wherein the sealing and centering section in the region neighboring and facing to the discharge window is recessed in a direction toward the immersion tube plate along the longitudinal axis.

3. The filter device according to claim 1, wherein the at least one immersion tube comprises
an immersion tube base and passes with the immersion tube base into the immersion tube plate,
wherein the sealing and centering section is provided at the immersion tube base.

4. The filter device according to claim 3, wherein an edge of the at least one sleeve is resting at a contact surface provided at the immersion tube base and axially seals and supports the at least one sleeve such that a second sealing surface is formed at the at least one immersion tube,
wherein the second sealing surface extends radially perpendicularly to the longitudinal axis.

5. The filter device according to claim 4, wherein the sealing and centering section in the region neighboring and facing to the discharge window, viewed along the longitudinal axis, is recessed to an axial position of the contact surface.

6. The filter device according to claim 1, wherein the sealing and centering section comprises
at least one circumferentially extending step.

7. The filter device according to claim 6, wherein an edge of the at least one sleeve is resting at a contact surface provided at the step and axially seals and supports the at least one sleeve such that a second sealing surface is formed at the at least one immersion tube,
wherein the second sealing surface extends radially perpendicularly to the longitudinal axis.

8. The filter device according to claim 7, wherein the sealing and centering section in the region neighboring and facing to the discharge window, viewed along the longitudinal axis, is recessed to an axial position of the contact surface.

9. The filter device according to claim 1, wherein an edge of the at least one sleeve is resting at a contact surface provided at the immersion tube plate and axially seals and supports the at least one sleeve such that a second sealing surface is formed at the at least one immersion tube plate,
wherein the second sealing surface extends radially perpendicularly to the longitudinal axis.

10. The filter device according to claim 9, wherein the sealing and centering section in the region neighboring and facing to the discharge window, viewed along the longitudinal axis, is recessed to an axial position of the contact surface.

11. The filter device according to claim 1, wherein the discharge window is an opening at an edge of the at least one sleeve.

12. The filter device according to claim 1, wherein the discharge window is a cutout at an edge of the at least one sleeve.

13. The filter device according to claim 1, wherein the at least one sleeve comprises
an inlet with a guide element for inflow of the fluid containing particles,
wherein the guide element is configured to cause a rotation of the fluid to guide the fluid along the inner surface of the at least one sleeve to separate the particles from the fluid.

14. The filter device according to claim 1, wherein the housing plate comprises
a plurality of the at least one sleeve and the plurality of sleeves extend each along the longitudinal direction,
wherein the immersion tube plate comprises
a plurality of the at least one immersion tube and the plurality of the immersion tubes extend each along the longitudinal axis, and
wherein the plurality of the immersion tubes project coaxially into the plurality of the sleeves.

15. The filter device according to claim 1, further comprising
a filter element configured to filter the fluid flowing out of the at least one immersion tube.

16. The filter device according to claim 1, wherein the at least one immersion tube comprises:
a conically tapering section which tapers in a direction along the longitudinal axis (L) towards the housing plate and projects coaxially into an interior of the at least one sleeve.

* * * * *